United States Patent [19]

Henson et al.

[11] 4,327,694
[45] May 4, 1982

[54] UNIT FUEL PUMP-INJECTOR WITH OVERFUEL CAPABILITY AND TIMING RETARDATION

[75] Inventors: Ralph B. Henson, Creve Coeur; James L. Martin, Chillicothe, both of Ill.

[73] Assignee: Caterpillar Tractor Co., Peoria, Ill.

[21] Appl. No.: 127,991

[22] PCT Filed: Nov. 1, 1979

[86] PCT No.: PCT/US79/00932
§ 371 Date: Nov. 1, 1979
§ 102(e) Date: Nov. 1, 1979

[87] PCT Pub. No.: WO81/01314
PCT Pub. Date: May 14, 1981

[51] Int. Cl.³ .................. F02M 59/26; F02M 59/42
[52] U.S. Cl. .................. 123/500; 123/179 L; 123/503
[58] Field of Search ............... 123/139 ST, 139 AE, 123/179 L, 139 AR, 139 AD, 139 E, 139 AP, 500, 501, 503

[56] References Cited

U.S. PATENT DOCUMENTS

| | | | |
|---|---|---|---|
| 2,195,927 | 4/1940 | Hurst | 123/139 ST |
| 2,696,807 | 12/1954 | Junge | 123/139 AR |
| 3,902,472 | 9/1975 | Baugelin | 123/139 ST |
| 4,147,148 | 4/1979 | Ito | 123/139 ST |
| 4,160,434 | 7/1979 | Daborowski | 123/139 ST |
| 4,165,723 | 8/1979 | Straubel | 123/139 AD |

FOREIGN PATENT DOCUMENTS

| | | | |
|---|---|---|---|
| 2804038 | 8/1979 | Fed. Rep. of Germany | 123/139 E |
| 696993 | 9/1953 | United Kingdom | 123/139 AE |

*Primary Examiner*—Charles J. Myhre
*Assistant Examiner*—Carl Stuart Miller
*Attorney, Agent, or Firm*—Wegner, Stellman, McCord, Wiles & Wood

[57] ABSTRACT

In fuel injectors of the type which include a rotating plunger (12) having a double helix, or "double scroll", control edges (62, 64), a control edge configuration is disclosed which improves the starting characteristics of certain internal combustion engines. A starting groove (76) and a starting projection (78) are provided in the control edges (62, 64) which simultaneously greatly increase the amount of fuel injected into the combustion space and retard engine timing. Also provided is a control mechanism (92–96) which prevents the injectors from accidently or intentionally rotating to the start position when the engine is running.

4 Claims, 10 Drawing Figures

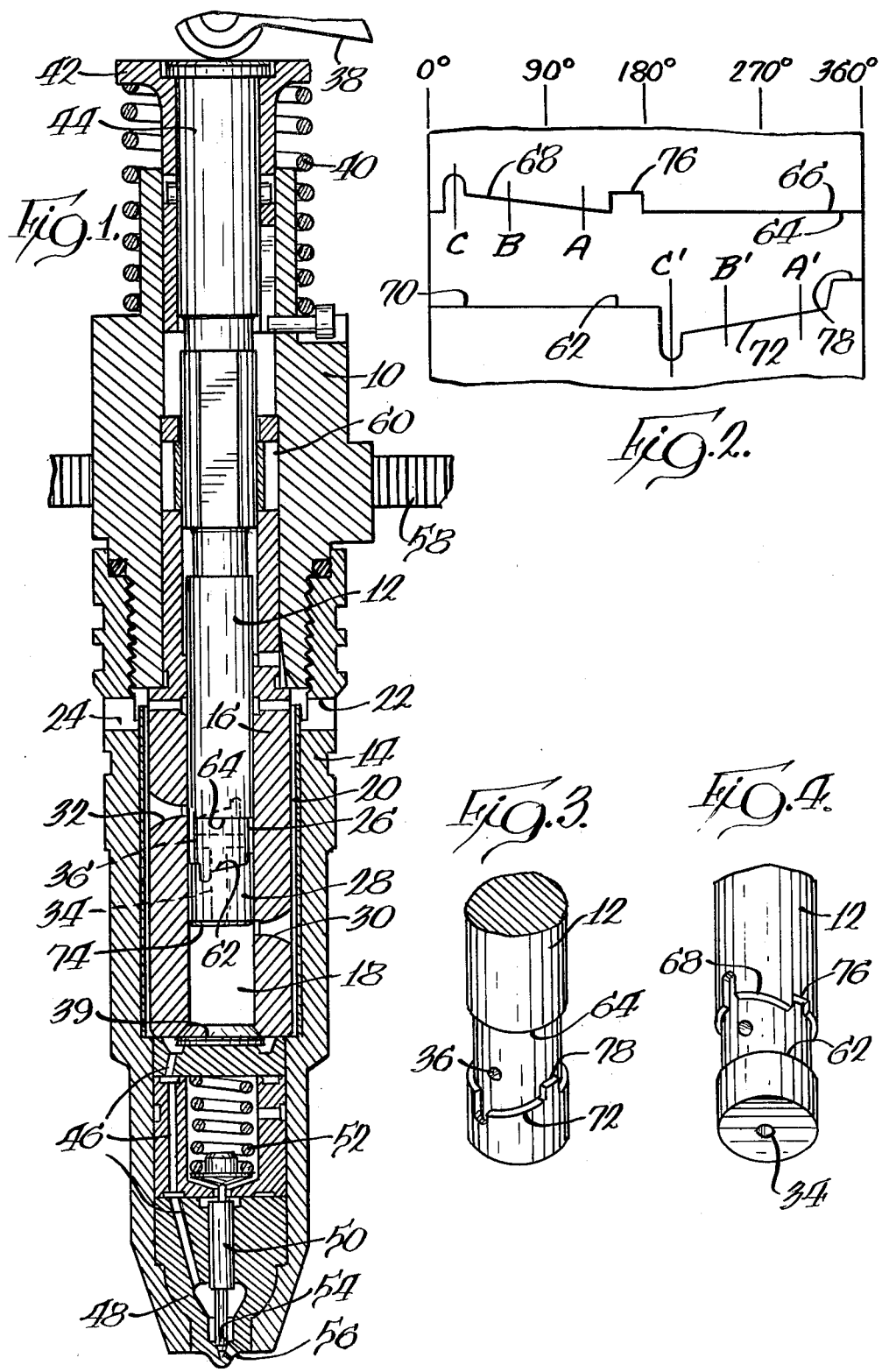

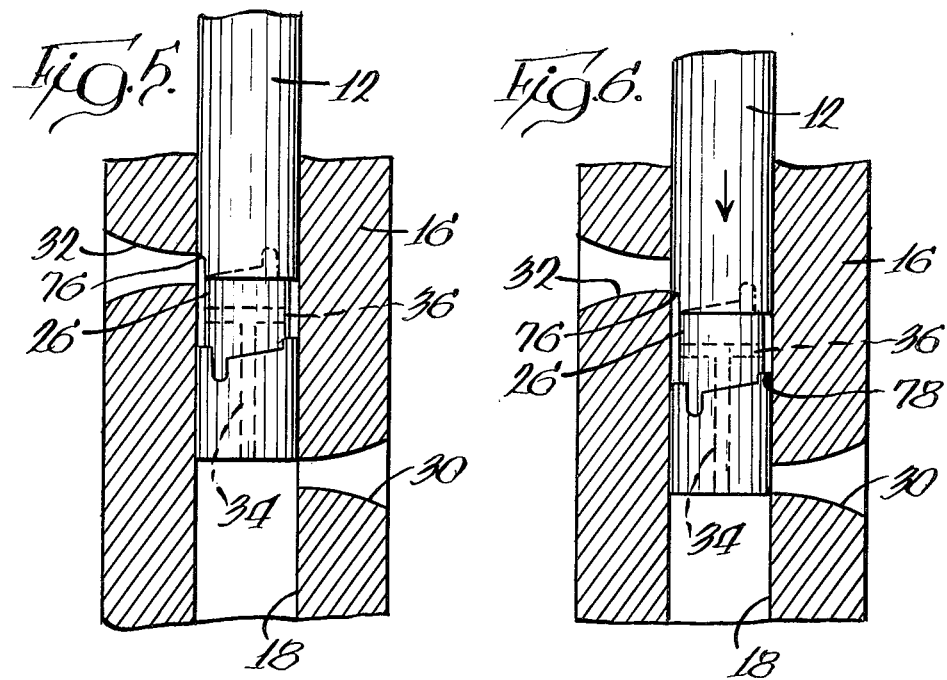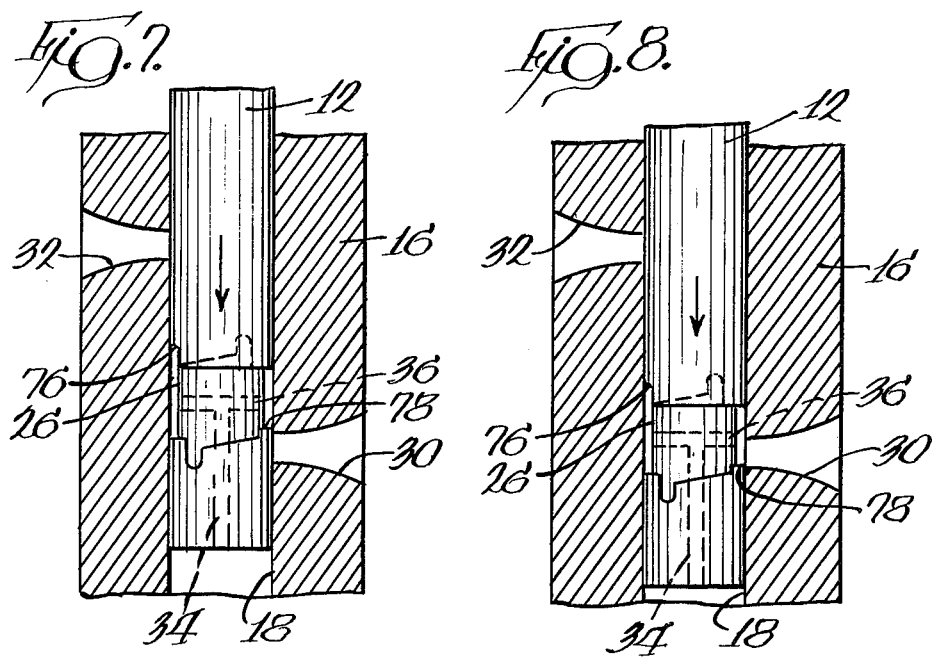

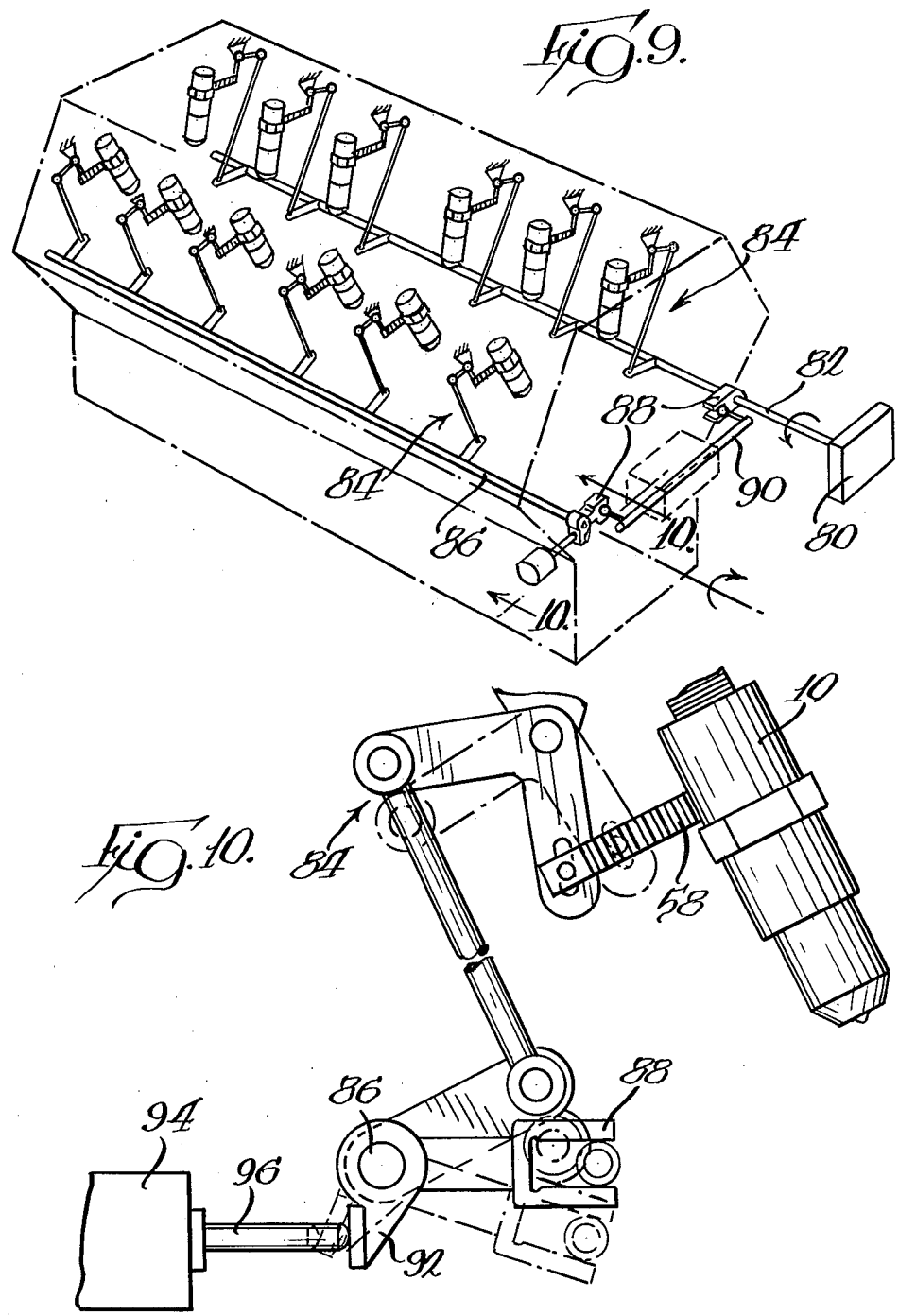

UNIT FUEL PUMP-INJECTOR WITH OVERFUEL CAPABILITY AND TIMING RETARDATION

DESCRIPTION

1. Technical Field

This invention relates to unit fuel pump-injectors such as are used for delivering metered amounts of fuel to internal combustion engines.

2. Background Art

Unit fuel pump-injectors have long been used with internal combustion engines, and particularly internal combustion engines operating on the diesel cycle. Injectors have been designed which adequately supply engine fuel needs throughout the whole spectrum of engine running conditions. Existing injectors vary the amount of fuel injected, and the point in the engine cycle at which this fuel is injected, into the engine cylinder from conditions of low speed, low load to high speed, high load operations.

Diesel engines have been notoriously difficult to start once they have cooled to low ambient temperatures, and this problem is magnified when diesel engines are used in cold weather environments. Unfortunately, existing fuel injectors have not adequately solved this problem.

One method of improving the startability of direct injection diesel engine is so-called "overfueling" wherein the engine is provided with an excess amount of fuel while being turned over by a starter.

In conjunction with overfueling, it has been found that it is desirable to introduce excess fuel at a predetermined point in the engine operating cycle. Previous methods of attempting to provide engine overfueling together with correct engine timing have proven inefficient, inexact and cumbersome. The most common method consists of placing the injector in a position that would correspond to a high speed-high load condition if the engine were running. This supplies excess fuel to the engine, but does not provide correct engine timing. This method does not greatly enhance startability and in addition, wastes a large amount of fuel.

DISCLOSURE OF INVENTION

The present invention is directed to overcoming the startability problems set forth above.

According to the present invention, the unit fuel pump-injector is utilized during the engine starting process to provide an excess amount of fuel at a predetermined point in the engine operating cycle. An improved metering or "scroll" groove is disclosed which includes a starting groove in the upper control edge and a starting projection in the lower control edge. These modifications operate in concert to simultaneously increase the quantity of fuel injected and retard injection timing, i.e. inject the fuel later in the engine operating cycle.

Also provided is a control system which senses and responds to engine starting. This system forces the control edge groove and projection out of the operating position and prevents the fuel injector from reentering the overfuel starting position while the engine is running.

The fuel quantity and injection timing control edge modifications are only operational during engine starting and do not interfere with normal engine operation.

BRIEF DESCRIPTION OF THE DRAWINGS

FIG. 1 is an enlarged longitudinal section of a unit fuel pump-injector made according to one embodiment of the present invention;

FIG. 2 is an enlarged developed view of the injector plunger cylinder in the vicinity of its scroll groove;

FIGS. 3 and 4 are perspective views of the lower portion of the injector plunger illustrating the scroll groove construction;

FIGS. 5-8 illustrate fuel flow and plunger operation during the engine starting process;

FIG. 9 illustrates schematically the positioning and operation of multiple unit fuel pump-injectors; and FIG. 10 is an end view of one fuel pump control rod and its associated control linkage.

BEST MODE FOR CARRYING OUT THE INVENTION

Referring to FIG. 1 of the drawings, a unit fuel pump-injector is shown, the upper portion of which is conventional and comprises a housing 10 in which a plunger 12 is reciprocable. Forming an extension of and threaded to the lower end of the housing 10 is a lower extension or nut 14, within which is supported a bushing 16 forming a pump cylinder 18 for the plunger 12. An annular space 20 surrounds the bushing 16 within the nut 14 and is supplied with fuel via a fuel passage 22 which is in turn connected to a conventional fuel pump or fuel gallery (not shown). Any excess fuel supplied to the annular space 20 flows through an outlet 24 and back to the fuel gallery or fuel tank (not shown).

Except for modifications which will be explained later, the plunger 12 has the usual external metering or scroll groove 26 adjacent its lower end 28, by which opening and closing of ports 30 and 32 in the bushing are controlled. The plunger 12 also includes connecting axial and transverse passages 34 and 36 for bypassing fuel from the pump cylinder 18 to the annular fuel space 20 when the groove 26 is in registry with one or the other of the ports 30 and 32.

Thus, as illustrated by FIGS. 1 and 5-8, during each downward or pumping stroke of the plunger 12 from its illustrated position (effected as by means of an engine rocker 38), fuel is initially bypassed to the fuel space 20 from the cylinder 18 below the plunger 12, but after the groove 26 has moved out of registry with the upper port 32 and the lower port 30 is closed by the lower portion 28 of the plunger 12, fuel is displaced under high pressure through the lower open end 39 of the cylinder 18 until the groove 26 moves into registry with the lower port 30 to again bypass fuel and end injection. Upon the plunger 12 thereafter reaching its lowermost position and during retraction of the rocker arm 38, return of the plunger 12 is effected by a spring 40 which, as shown, may be interposed for this purpose between the housing 10 and a follower 42 attached to the upper end 44 of the plunger 12.

The fuel charge delivered from the pump cylinder 18 flows through a passage 46 into the lower end or spray tip 48 of the injector where it acts upwardly against the injection valve 50 to raise the latter against its biasing spring 52 to open the fuel outlet 54 for injection of the fuel charge into the engine cylinder (not shown) via spray orifices 56. Other details of the injector below the lower end 39 of the pump bushing are conventional and form no part of the present invention.

Also in accordance with conventional practice, the plunger 12 is angularly rotatable by means of a rack 58 and pinion 60, thereby enabling regulation of the fuel charge injected per cycle. By rotating the plunger 12, the relationship between the plunger groove 26 and the fuel ports 30 and 32 may be varied, thereby varying the point at which the effective pumping stroke begins and ends, consequently varying the quantity of fuel injected and the timing of the injection stroke.

Fuel injection is controlled continually over the entire spectrum of engine operating conditions by means of a so-called "double scroll" plunger groove 26 which refers to the fact that control edges 62 and 64 are formed around the periphery of the plunger 12 in the general shape of a double helix. Referring to FIG. 2, which is a developed view of the entire circumferential plunger groove 26, it will be seen that the upper control edge 64 is comprised of a flat portion 66 perpendicular to the longitudinal axis of the plunger 12 and an inclined portion 68. Likewise, the lower control edge 62 is comprised of a flat section 70 and an inclined portion 72. It is important to note that the lower inclined edge 72 is formed at an angle opposite to that of the upper inclined edge 68. Also, since the upper and lower fuel ports, 32 and 30, are diametrically opposed, the portion of the upper control edge 64 in register with the upper fuel port 32 will correspond to a point of registry between the lower edge 62 and the lower fuel port 30 that is 180° out-of-phase. For example, if the plunger 12 were rotationally positioned such that a point A on the upper control edge 64 was aligned with the upper fuel port 32, point A′ on the lower control edge 62 would be in line with the lower fuel port 30.

As indicated above, the upper and lower helical control edges, 64 and 62, respectively, perform the dual functions of controlling the amount of fuel injected and controlling injection timing, which refers to the portion of the engine cycle at which fuel injection begins.

The quantity of fuel injected is determined by the axial spacing between the control edges 64 and 62. Fuel delivery begins when the upper control edge 64 moves out of registry with the upper fuel port 32, and ends when the lower control edge 62 moves into registry with the lower fuel port 30. The amount of fuel injected is thus inversely proportional to the distance between the upper 64 and lower 62 control edges. This is so because if the gap is relatively large, the distance the plunger 12 will travel after the upper control edge 64 moves out of registry with the upper port 32 and before the lower fuel port 30 is uncovered will be relatively short thereby injecting a small quantity of fuel. The converse is also true; if the gap between the upper 64 and lower 62 control edges is relatively narrow, the plunger 12 will travel a long distance before the plunger groove 26 moves out of and into registry with the fuel ports 32 and 30, thereby injecting a relatively large amount of fuel.

Since the inclined portion 72 of the lower control edge 62 is formed at an angle opposite to that of the inclined portion 68 of the upper control edge 64, the gap distance between corresponding points on the upper and lower edges 64, 62 may be continuously varied by rotation of the plunger 12. As shown in FIG. 2, as the plunger is rotated from a position where point A on the upper edge 68 is aligned with upper port 32 to a position wherein point B is aligned with the upper port 32, the gap distance between the upper control edge 64 and the corresponding points A′ and B′ on the lower control edge 62 in line with the lower fuel port 30 will be continually increased. Therefore the quantity of fuel injected during each plunger stroke will be correspondingly continually decreased.

Injection timing, on the other hand, is controlled within the injector by the axial position of the upper control edge 64 with respect to the lower edge 74 of the plunger 12. Fuel injection begins only when the lower fuel port 30 is covered by the lower portion 28 of the plunger 12 and the upper control edge 64 has moved out of registry with the upper fuel port 32. This is because even after the lower edge 74 of the plunger 12 completely passes the lower port 30, fuel will continue to be bypassed through the axial and transverse passageways 34, 36, the groove 26 and the upper port 32 until the upper control edge 64 completely passes out of registry with the upper port 32. Thus, if the upper control edge 64 were translated axially upwardly along the plunger 12, as viewed in FIG. 1, fuel injection would occur later in the engine cycle since the plunger must travel a greater distance before the control edge 64 passes the upper port 32. The consequence of the inclined portion 68 of the upper control edge 64 is that as the plunger 12 is rotated from a position where point A is aligned with the upper port 32 to a position where point B on the inclined surface 68 is aligned with the port 32, fuel injection timing will be progressively retarded, i.e. fuel injection will occur progressively later in the engine operating cycle.

Since the shape of the upper control edge 64 is largely responsible for injection timing (in conjunction with the lower plunger edge 74) and the coaction of control edges 64 and 62 governs the quantity of fuel injected, the result is that both injection timing and the quantity of fuel injected during each injection stroke may be simultaneously varied by rotation of the plunger 12.

Referring to FIG. 2, as the plunger 12 is rotated from a position where points A and A′ are aligned with the fuel ports 32 and 30 to a position where points B and B′ are aligned with these ports, fuel injection will be continuously varied between conditions wherein a large amount of fuel is injected relatively early in the engine cycle (A—A′) to a condition where a small amount of fuel is injected relatively late in the engine cycle (B—B′).

The flat portions 66, 70 of the upper 64 and lower 62 control edges are at no time aligned with either the upper or lower fuel ports 32 and 30, and therefore form no part of the fuel injection process. These surfaces 66, 70 are present merely to complete the circumferential groove 26 around the plunger 12.

The notches indicated by C and C′ in FIG. 2, are included in the groove 26 to provide a means to shut off the engine. When the plunger is rotated such that C and C′ are aligned with the upper and lower fuel ports, 32 and 30, respectively, it will be seen that no fuel will be injected. The engine will be fuel starved and engine operation will cease.

While the above mentioned arrangement of the upper 64 and lower 62 control edges has proven adequate in supplying engine fuel demands over a range of operating conditions, i.e. from no load, low speed idle to high speed, high load conditions, there has not heretofore been any provision made for the unique problems encountered during engine starting. To improve startability, and particularly in cold climate situations, it is necessary to inject an amount of fuel that is equal to or greater than that injected at a high speed, high load operating condition, and inject this fuel later in the operating cycle, as for example, 10° of engine mainshaft revolution.

In order to provide these relatively unusual engine fuel requirements without unnecessarily complicating the engine or appreciably increasing cost, the upper 64 and lower 62 control edges are modified according to the present invention to include a starting groove 76 in the upper control edge 64 and a starting projection 78 in the lower control edge 62. Both the groove 76 and the projection 78 are generally rectangular in shape with the groove 76 extending a lesser distance above its associated flat portion 66 of the control edge 64 than the projection 78 extends above its associated flat portion 70 of the lower control surface 62.

From the discussion above, it will be apparent that since the groove 76 is extended axially upwardly along the plunger 12, fuel injection will occur relatively late in the engine operating cycle. Further, since the amount of fuel injected is inversely related to the gap distance between the two control edges 64, 62, the quantity of fuel injected will be relatively large since the gap between the groove 76 and the projection 78 is relatively narrow.

An inspection of FIG. 2 will reveal that the groove 76 extends farther axially above its related flat control edge 66 than any portion of the inclined surface 68 and that the gap distance is smaller than that of any other matching points on the inclined surfaces 68, 72. Therefore, when the groove 76 is in alignment with the upper port 32, fuel will be injected later in the engine operating cycle than is possible when any portion of the inclined edge 68 is in alignment with the upper port 32. Also, a larger amount of fuel will be injected when the groove 76 and projection 78 are in alignment with the upper and lower fuel ports 32 and 30 than will be injected at any other rotational position of the plunger 12 since the groove 76 extends a lesser axial distance than the projection 78.

As shown in FIG. 9, unit fuel pump-injectors are provided for each engine cylinder and are adjusted in unison. When engine demands require that the amount of fuel injected be changed, a governor (indicated schematically by 80), or other conventional control device, causes a first control rod 82 to rotate which in turn causes movement of the toothed rack 58 through a pivoted linkage 84. Movement of the toothed rack 58 causes the plunger 12 to rotate, thereby changing the amount of fuel injected and injection timing as explained above.

Motion of the first control shaft 82 is translated to a second control shaft 86 located on the opposite side of the engine through dual ball-and-socket joints 88 and a cross shaft 90 suitably mounted on the engine. Rotation of the second control linkage 86 results in rotation of the plungers 12 of the second bank of fuel injectors as described above with respect to the first control rod 82.

Since an excess amount of fuel is delivered to the engine when the starting groove 76 and the starting projection 78 are in register with the upper and lower fuel ports, 32, 30, it is necessary that means be provided to prevent the plungers 12 from rotating to the starting position when the engine is running. This is so because excess fuel injected into the engine cylinder while the engine is running could result in engine runaway and would cause excessive engine heating, hydrocarbon emissions and fuel waste.

To this end, the second control rod 86 is provided with a full load rotational stop tab 92, a control 94 and a stop arm 96, as shown in FIG. 10. While the control 94 is hereinafter described as an electrical solenoid, the control may be any conventional device, such as a mechanical governor or a hydraulic actuator.

When the engine is not running, the solenoid 94 is deactivated, which causes the stop arm 96 to be in a retracted position which in turn allows the second control arm 86 and associated linkage 84 to rotate fully to the start position (dashed lines). As explained above, this linkage 84 movement causes the plunger 12 to rotate to a position where the starting groove 76 and the starting projection 78 are in alignment with the upper 32 and lower 30 fuel ports.

After the engine starts, the solenoid 94 is activated by a control mechanism, which may be an engine speed sensor, associated with the engine speed control 80, causing the stop arm 96 to extend. As the stop arm 96 moves toward its extended position (solid lines) it will contact the stop tab 92 attached to the second control shaft 86 and cause the shaft 86 and its associated linkage 84 to move to a running position. At all times when the engine is running, the stop arm 96 will be in the extended position thereby preventing the plunger 12 from rotating to the start position.

INDUSTRIAL APPLICABILITY

When it is desired to start the engine, the first control shaft 82 is rotated to the start position which places its associated bank of fuel pump-injectors in a position where the starting groove 76 and starting projection 78 register with the upper 32 and lower 30 fuel ports, respectively. Simultaneously, by means of the cross shaft 90, the second control shaft 86 rotates its associated bank of fuel pump-injectors to the start position. This motion will be possible because the solenoid 94 has not yet been activated and therefore the stop arm 96 will not interfere with the full load rotational stop tab 92.

Since the injectors are in the start position, a large amount of fuel will be injected into the engine cylinders and injection timing will be retarded.

After the engine has started and has reached a predetermined speed, a control mechanism 80 will activate the solenoid 94 causing the stop arm 96 to extend and contact the stop tab 92. The solenoid will thus force the second control shaft 86 to rotate which will force its associated bank of injectors to move away from the start position. Since the second control shaft 86 is linked to the first control shaft 82, located on the opposite side of the engine, the remaining bank of fuel injectors will also be repositioned.

The solenoid 94 will remain energized at all times while the engine is running and will thereby prevent the injectors from reentering the start position by means of stop arm 96 and stop tab 92. The stop arm 96 and the stop tab 92 will in no way interfere with the normal operation of the engine or the unit fuel pump-injectors since the stop tab 92 is free to rotate away from the arm 96, but this mechanism will prevent the control shafts 82, 86 from overrotating in the opposite direction to the start position.

It will thus be seen that the desirable starting conditions of an excess amount of fuel injected into the engine cylinder and retarded injection timing are achieved relatively inexpensively and without interfering with normal engine operation.

Those skilled in the art will realize that the concept described herein need not be limited to a unit fuel pump-injector or a fuel pump-injector unit which utilizes a double scroll pattern. Other devices which could advantageously apply the overfuel/injection retardation control edge modification could include, for example, a distributor type fuel pump having either a single or double helical control edge plunger, or a unit fuel pump-injector in which the plunger has only a single helical control edge.

Other aspects, objects and advantages of the invention may be obtained from a study of the drawings, description and appended claims.

We claim:

1. In a plunger-type fuel injection pump comprising a pump cylinder (18) having a discharge outlet (38) associated with one end, an upper side port (32) spaced from said outlet (38) and a lower side port (30) located intermediate said upper port (32) in said outlet (38), a fuel supply chamber (20) interconnecting said ports (30, 32) externally of the cylinder (18), and a plunger (12) axially rotatable and longitudinally reciprocable in the cylinder (18) having upper (64) and lower (62) control edges operative to sequentially close the cylinder ends of said upper (32) and lower (30) ports during longitudinal movement of the plunger (12) towards said outlet (38) on the pumping stroke, said plunger (12) having a circumferentially extending groove (26) intermediate of and defined by said control edges (62, 64), and a longitudinal passage (34, 36) connecting said groove (26) to the remote end of said plunger (12), whereby during the pumping stroke fuel in the cylinder (18) between the plunger (12) and outlet (38) is bypassed to the supply chamber (20) until the plunger (12) has advanced far enough to effect closure of both of said ports (30, 32) by said control edges (62, 64), and thereafter fuel is displaced from the cylinder (18) via said outlet (38) until the plunger (12) has further advanced to effect registry of said groove (26) with said lower port (30), said control edges (62, 64) being disposed helically (68, 72) of the plunger (12) axis, whereby the quantity of said fuel displaced during each plunger (12) pumping stroke may be continually varied over a range of maximum, intermediate and minimum values and whereby the initiation and termination of said pumping stroke may be continually varied by rotational adjustment of said plunger (12), the improvement comprising:

a longitudinal groove (76) extending from said upper control edge (64) away from said circumferential groove (26) and a longitudinal projection (78) extending from said lower control edge (62) into said circumferential groove (26) a distance substantially equal to the extension of said longitudinal groove (76) relatively angularly situated such that the groove (76) will register with said upper port (32) and said projection (78) will register with said lower port (30) to delay the closing of said upper port (32) and the opening of said lower port (30) whereby the initiation of the injection is retarded and the volume of fuel injected is increased.

2. In a fuel injector for an internal combustion engine which includes a pump cylinder (18), a fluid receiving chamber (20) externally of the cylinder (18), at least two ports (30,32) connecting the interior of the cylinder (18) with said receiving chamber (20), a plunger (12) slidably fitting in said cylinder (18) and rotatable to at least a start and a run position having two axially spaced control edges (62,64) separated by a circumferential groove (26) to control the passage of fluid through said ports (30,32), and internal passages (34,36) connecting the end of the plunger (12) with the groove (26) between the control edges (62,64), the relative spacing of said control edges (62,64) and said ports (30,32) being such that during the movement of said plunger (12) in its pumping direction said ports (30,32) are closed to initiate an injection and said injection is terminated by the opening of a port (30,32) by a control edge (62,64), the improvement comprising:

means (76,78) associated with said control edges (62,64) to delay the closing of one of said ports (30,32) and to delay the opening of the other of said ports (30,32) to simultaneously retard the initiation of fluid injection and increase the volume of fluid injected said control edge delaying means being comprised of a longitudinal groove (76) connected to said circumferential groove (26) of a width substantially equal to said port (32) extending from said control edge (64) in a direction oppositely to the direction of plunger (12) motion during an injection stroke and a longitudinal projection (78) of the plunger (12) body of a width substantially equal to said port (30) which extends into said circumferential groove (26) away from the other of said control edges (62) in a direction oppositely to the direction of plunger (12) motion during an injection stroke, said groove (76) and said projection (78) cooperating to delay the closing of one of said ports (32) and delay the opening of the other of said ports (30) to simultaneously delay the initiation of fluid injection and increase the quantity of fluid injected.

3. The improved fuel injector of claim 2 wherein said control edges (62, 64) are disposed helically (68, 72) of the plunger (12) axis, whereby the quantity of said fluid displaced during each plunger (12) pumping stroke may be varied over a range of maximum, intermediate and minimum values and whereby the initiation and termination of said pumping stroke may be continually varied by rotational adjustment of said plunger (12).

4. The improved fuel injector of claim 3 wherein said ports (30, 32) are angularly spaced from each other and wherein said longitudinal groove (76) and said longitudinal projection (78) are circumferentially adjacent said helical portion (68, 72) of said control edges (64, 62) and angularly spaced from each other a distance equal to the angular spacing of said ports (30, 32).

* * * * *